United States Patent Office 2,847,346
Patented Aug. 12, 1958

2,847,346

LAXATIVE COMPOSITIONS CONTAINING DIOCTYL SODIUM SULFOSUCCINATE AND 1,8-DIHYDROXYANTHRAQUINONE

Joseph B. Vaughan, Norwood, Ohio, assignor to Lloyd Brothers, Inc., Cincinnati, Ohio, a corporation of Ohio No Drawing. Application November 20, 1956
Serial No. 623,282

6 Claims. (Cl. 167—56)

The present invention relates to novel and improved compositions for treating constipation and methods for preparing the same. More specifically, the invention is directed to compositions containing as essential ingredients dioctyl sodium sulfosuccinate and 1,8-dihydroxyanthraquinone in a pharmaceutical diluent or carrier.

Dioctyl sodium sulfosuccinate is an old chemical compound sold under the trademark "Aerosol OT" and has been known for many years as a detergent, as a dispersing agent for pigments in varnishes, etc. More recently its use in the clinical field for treatment of fecal impaction has been described. Wilson et al. J. A. M. A. 158, 261–263 (1955). The product, 1,8-dihydroxyanthraquinone is also an old chemical compound sold under the name "danthron" and its use as a valuable cathartic which operates essentially in the lower bowel is also known. As a cathartic danthron's recommended daily dose is 75–150 mg., depending on the patient's condition, and as the action of danthron, like all cathartics, is relatively "harsh" at high dosage and may be accompanied by unwanted side effects, including diarrhea, attempts have been made to modify its action so as (a) to avoid the unwanted side reactions and at the same time (b) to retain its highly beneficial cathartic action. Included in these attempts were reductions in daily dosage but these proved unsuccessful as the minimum recommended dose (75 mg./day) and sometimes the maximum dose (150 mg./day) were found necessary for desired cathartic action. Marks, M.M.; Am. J. Digest, Dis. 20, 240 (1953).

In my investigations in this field in attempts to solve the problem, I combined dioctyl sodium sulfosuccinate, which is physiologically inert and has no laxative activity, with danthron. This combination proved compatible and extensive tests have demonstrated that the administration of danthron with the proper amounts of dioctyl sodium sulfosuccinate makes it possible to reduce the dosage of danthron and still obtain its beneficial and desired cathartic action. The reason for this synergistic effect is not fully understood but investigations now suggest that it is at least in part due to reduced absorption of the active cathartic (danthron) in the presence of dioctyl sodium sulfosuccinate in the small bowel coupled with or without some other synergistic activity. With reduced absorption in the small bowel there is a greater proportion of danthron available to act as a cathartic in the large bowel where desired activity takes place. Danthron's activity is totally unlike the activity of milk of magnesia which has a salt type effect and brings water into the gut.

The following examples will serve to illustrate the invention.

*Example I.—Tablet*

| | Gm. |
|---|---|
| Dioctyl sodium sulfosuccinate | 300 |
| 1,8-dihydroxyanthraquinone (danthron) | 250 |
| Lactose | 550 |
| Starch | 325 |

Mix the lactose, starch and danthron. Prepare a solution of the dioctyl sodium sulfosuccinate in about 600 ml. of isopropanol. Mix the powder mixture and solution well and allow to dry while mixing slowly. Spread out and air dry overnight. Granulate with about 12 fluid ounces of 16⅔ percent aqueous starch paste. Lubricate with a small quantity (less than 1 percent) of magnesium stearate as needed or desired. Bring to 1500 grams with starch. Compress into 5000 (about 0.3 g. each) tablets. A tablet made in accordance with the above procedure contains about 60 mg. of dioctyl sodium sulfosuccinate and about 50 mg. of danthron. In a similar manner the above and like mixtures can be encapsulated into hard two-piece gelatin capsules.

*Example II.—Capsule—soft gelatin*

| | | |
|---|---|---|
| Dioctyl sodium sulfosuccinate | gm | 300 |
| 1,8-dihydroxyanthraquinone | gm | 250 |
| Mineral oil, q. s. ad | cc | 2500 |

The dioctyl sodium sulfosuccinate is first dissolved in about 1500 cc. of mineral oil with warming. To facilitate solution and particularly to maintain the dioctyl sodium sulfosuccinate in solution in the oil it is preferred to carry out this step with the addition of about 0.5 to 1.0 percent glyceryl mono- or di-oleates as described in the copending application of Lyell J. Klotz, Serial No. 581,855, filed May 1, 1956. The danthron in finely divided form is then thoroughly mixed in the oil solution where it forms a suspension. To aid in stabilizing the suspension small amounts of viscosifying (suspending) agents such a hydrogenated vegetable oil, white beeswax and the like can be added to the composition in accordance with standard practices in this art if desired. The composition is then brought to 2500 cc. with mineral oil and encapsulated into 5000 soft gelatin (about 0.5 cc. each) capsules. Each capsule contains about 60 mg. of dioctyl sodium sulfosuccinate and about 50 mg. of danthron. They have been found to be as effective in the desired cathartic action as an ordinary capsule containing the recommended 75 mg. of danthron. Where capsules are not desired the composition employed above for use in the capsules can be used as such as a liquid pharmaceutical preparation.

*Example III.—Tablet*

| | Gm. |
|---|---|
| Dioctyl sodium sulfosuccinate | 100 |
| 1,8-dihydroxyanthraquinone | 375 |
| Lactose | 600 |
| Starch | 350 |

Mix the lactose, starch and 1,8-dihydroxyanthraquinone. Prepare a solution of the dioctyl sodium sulfosuccinate in 200 ml. isopropanol. Mix the powder mixture and solution well and allow to dry while mixing slowly. Spread out and air dry overnight. Granulate with about 12 fluid ounces of 16⅔ starch paste. Lubricate with a small quantity of magnesium stearate as needed or desired. Bring to 1500 g. with starch. Compress into 5000 (about 0.3 g. each) tablets. A tablet made in accordance with the above procedure contains about 20 mg. of dioctyl sodium sulfosuccinate and 75 mg. of 1,8-dihydroxyanthraquinone. Concentrations can be varied to provide a dosage unit containing 10–60 mg. or more of dioctyl sodium sulfosuccinate.

In a similar manner to those described above compositions containing 20 to 480 mg. of dioctyl sodium sulfosuccinate to 25 to 100 mg. of danthron can be prepared. When these or other compositions are tabletted or encapsulated for a single daily dose, however, the amount of danthron present in a dosage unit (tablet or capsule) should not exceed 100 mg. and preferably should be within the range of around 50 mg. per tablet or capsule. A dosage unit containing 75 or 100 mg. of danthron can be employed where the maximum daily dose (150 mg.) has been previously indicated. Where multiple doses are to be taken daily, tablets and capsules can be readily prepared containing 10 to 60 mg. of dioctyl sodium sulfosuccinate and 10 to 25 mg. of danthron. In a dosage unit containing 10 up to 20 mg. of danthron, the amount by weight of dioctyl sodium sulfosuccinate should at least be equal to the amount by weight of danthron, i. e. a composition containing 10 mg. of danthron must contain 10 mg. of dioctyl sodium sulfosuccinate and a composition containing 20 mg. or more of danthron must contain at least 20 mg. of dioctyl sodium sulfosuccinate. This is required to obtain substantial synergistic effect and in most instances the use of 120 percent or more of dioctyl sodium sulfosuccinate as compared to danthron, and in sufficient amounts to provide at least 60 mg. of dioctyl sodium sulfosuccinate per day, is preferred and indicated.

The present application is a continuation-in-part of my prior application Serial No. 584,476, filed May 14, 1956, which is in turn a continuation-in-part of my prior application Serial No. 537,873, filed September 30, 1955.

I claim:

1. A composition in dosage unit form for treating constipation consisting essentially of 10 to 100 mg. of 1,8-dihydroxyanthraquinone, 20 to 480 mg. of dioctyl sodium sulfosuccinate and a pharmaceutical carrier.

2. A composition in dosage unit form for treating constipation consisting essentially of about 50 mg. of 1,8-dihydroxyanthraquinone and at least about 60 mg. of dioctyl sodium sulfosuccinate and a pharmaceutical carrier.

3. A composition in accordance with claim 2 where the dosage unit is in a form selected from the group consisting of tablets and hard two-piece gelatin capsules and where the pharmaceutical carrier is a solid carrier comprising essentially a mixture of lactose and starch.

4. A composition in accordance with claim 2 where the dosage unit is in soft gelatin capsule form and the pharmaceutical carrier is mineral oil.

5. A dosage unit in accordance with claim 1 containing at least 20 percent more by weight of dioctyl sodium sulfosuccinate than the weight of 1,8-dihydroxyanthraquinone in said dosage unit.

6. The method of treating constipation with relatively low, reduced dosages of 1,8-dihydroxyanthraquinone which consists in orally administering in dosage unit form a composition consisting essentially of the 1,8-dihydroxyanthraquinone and at least 20 mg. of dioctyl sodium sulfosuccinate per dosage unit.

References Cited in the file of this patent

Hubacher: J. A. P. A. (Sci. Ed.), vol. 42:1, January 1953, pp. 23–30 (pp. 23, 26 and 27 relied on).

Wilson: J. A. M. A., vol. 158, No. 4, May 28, 1955, pp. 261 and 262.